Figure 1:
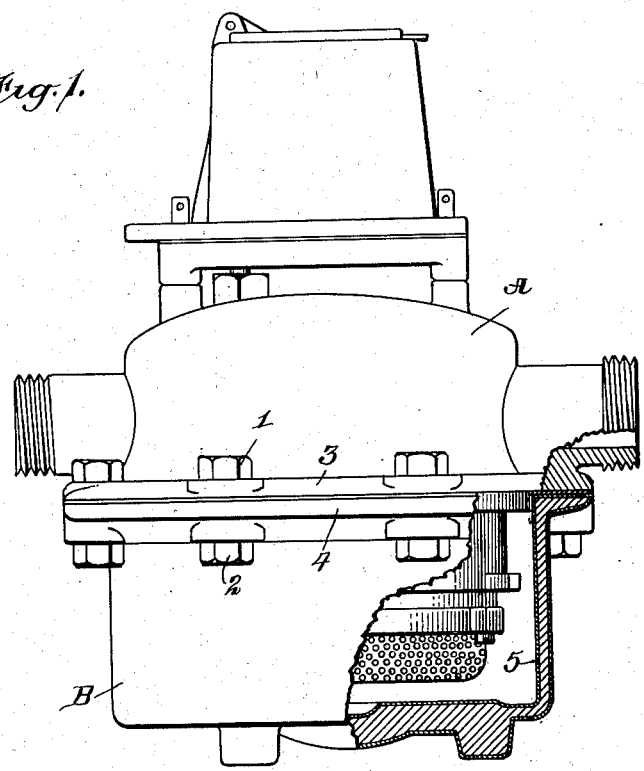

Jan. 8, 1935. P. A. POTTER 1,986,852

WATER METER

Filed April 6, 1933

WITNESSES

INVENTOR
Philip A. Potter
BY
ATTORNEYS

Patented Jan. 8, 1935

1,986,852

UNITED STATES PATENT OFFICE 1,986,852

WATER METER

Philip A. Potter, Hohokus, N. J.

Application April 6, 1933, Serial No. 664,802

4 Claims. (Cl. 73—98)

This invention relates to water meters, an object of the invention being to so construct the water meter as to prevent galvanic action, electro-chemical action and electrolytic action.

It has been the common practice to construct water meters partly of iron and partly of bronze or the like, in usual constructions the main portions being of bronze or copper, and the base or bottom of iron, although in some meters the top is of iron and the base of bronze. Thus, when water is in the meter galvanic action is set up, so that the major portion of the meter constitutes a cathode and the base an anode; an electric current is then set up and the iron of the base is deposited on the major portion of the water meter so that in a short time the base is worn away and becomes leaky and inefficient.

I have discovered that by providing the iron base with a vitreous enamel coating covering all portions thereof, I successfully prevent the galvanic action and preserve the life of the water meter as a whole. It is this idea of providing an enameled base which constitutes the broad idea of my invention.

This combination of metals with the water passing through the meter forms a galvanic cell of which the iron parts are the anode. The cast iron parts are rapidly destroyed by three actions:

First: Galvanic action, the iron of the meter being removed from the base and filling up the water passages with iron oxide.

Second: Electrochemical action, the same action taking place between the various constituents of the cast iron, certain constituents acting as the anodes and being removed from the iron parts of the meter and adding to the iron oxides in the meter.

Third: Electrolytic action, most water services are used by the customer as a ground for his electric system, part or the whole of any stray currents passing out through the meter. This electrolytic action will cause the same destruction of iron parts and tends to excite further galvanic or electrochemical action.

These three actions sometimes destroy a bottom in a year and a-half and the average meter in some water systems is completely filled with iron oxides in six years, resulting in the following causes of expense and loss:

First: Meter must be cleaned out.

Second: Faster mechanical wear of parts moving in water increasing the clearance in the measuring chamber and causing decreased registration.

Third: Decreased registration due to increased friction in the meter.

Fourth: Loss of capacity due to the clogging up of water passages resulting in decreased revenue and earlier removal of the meter for repairs to give the customer the capacity which he desires.

The enameling of the iron parts of a water meter with vitreous enamel prevents all these undesirable effects:

First: By keeping the anodic iron from the electrolyte (water) thus preventing the forming of a galvanic cell, electrochemical action on the surface of the iron, and electrolytic action from the iron to water.

Second: By insulating the anode (iron parts) from the cathode (bronze parts).

With these and other objects in view, the invention consists in certain novel features of construction and combinations and arrangements of parts, all of which will be more fully hereinafter described and pointed out in the claims.

In the accompanying drawing,—

Figure 2:
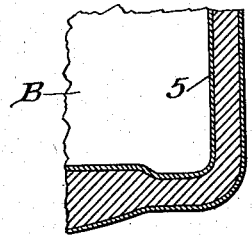

Figure 1 is a view mainly in side elevation, but partly broken away, illustrating my invention; and Figure 2 is an enlarged fragmentary view of a portion of the wall of the casing or base.

A represents the main portion of the water meter, which is usually of bronze or copper, and B is the iron bottom, receptacle, or base, receiving the lower end of the meter and which is secured to the main portion of the meter by bolts 1 and nuts 2 projected through flanges 3 and 4, respectively, on the main portion and base.

5 represents a coating of vitreous enamel, which is preferably baked onto all surfaces of the base, and this enamel prevents galvanic action within the base and, consequently, prevents any deterioration of the base due to such galvanic action, and has all of the advantages above enumerated.

It has been stated that the iron part or parts of a water meter are coated with a vitreous enamel. This is preferable because of its glassy substance and surface. A surface of this character is impervious to water under all ordinary circumstances, thereby completely isolating the iron part from the exterior and preventing destructive galvanic action.

Another feature of importance comprises the ability to machine an enameled surface of the foregoing character. Machining takes place on the surface of the flange of the base B. It comprises grinding down the surface until a water tight joint is obtained. The vitreous enamel is applied sufficiently thick to allow for the machining and yet not expose the iron at any place.

While I have illustrated my invention in connection with a particular type of water meter, it is obvious that the form and construction of the parts may be varied, and I do not wish to be limited to the specific construction of meter illustrated but desire to cover my invention in connection with any type of water meter which is of copper or bronze in combination with an iron base having an enamel baked thereon to prevent galvanic and other detrimental action when water is in the meter.

What I claim is:

1. A water meter having a portion of bronze, and an iron base secured thereto, said iron base having a vitreous enamel coating thereon preventing galvanic action within the meter.

2. A water meter having a portion of bronze, and an iron base secured thereto, said iron base having a vitreous enamel coating thereon preventing galvanic action within the meter, said enamel coating extending throughout all surfaces of the base.

3. A water meter or the like having connected parts of different metals subject to a galvanic action by mutual contact with the liquid, and a coating of vitreous enamel on at least one of the parts, said enamel being inseparably fused into the surface of said part.

4. A water meter or the like having connected parts of anodic and cathodic characteristics tending to set up a galvanic action by mutual contact with the liquid, and a coating of vitreous enamel on the anodic part, said enamel being of machinable thickness and inseparably fused into the surface of said anodic part.

PHILIP A. POTTER.